(12) United States Patent
Chen et al.

(10) Patent No.: US 7,657,139 B2
(45) Date of Patent: Feb. 2, 2010

(54) Y-JUNCTION REFLECTOR TUNABLE DELAY OR RESONATOR WAVEGUIDE DEVICES

(75) Inventors: Jianxiao Chen, La Jolla, CA (US); Paul Kit Lai Yu, San Diego, CA (US); Tetsuya Kawanishi, Tokyo (JP); Kaoru Higuma, Chiba (JP)

(73) Assignees: The Regents of the University of California, Oakland, CA (US); National Institute of Information and Communication, Tokyo (JP); Sumitomo Osaka Cement Co., Ltd., Tokyo (JP)

( * ) Notice: Subject to any disclaimer, the term of this patent is extended or adjusted under 35 U.S.C. 154(b) by 249 days.

(21) Appl. No.: 11/628,572

(22) PCT Filed: Jun. 1, 2005

(86) PCT No.: PCT/US2005/019095

§ 371 (c)(1),
(2), (4) Date: Dec. 4, 2006

(87) PCT Pub. No.: WO2005/120194

PCT Pub. Date: Dec. 22, 2005

(65) Prior Publication Data

US 2008/0267565 A1    Oct. 30, 2008

Related U.S. Application Data

(60) Provisional application No. 60/577,676, filed on Jun. 7, 2004.

(51) Int. Cl.
*G02B 6/26* (2006.01)
(52) U.S. Cl. .................... 385/45; 385/15; 385/31; 385/39
(58) Field of Classification Search .............. 385/15, 385/39, 45, 31
See application file for complete search history.

(56) References Cited

U.S. PATENT DOCUMENTS 6,570,893 B1 * 5/2003 Libatique et al. ............ 372/20
7,123,800 B2 * 10/2006 Kaplan ....................... 385/50

OTHER PUBLICATIONS

J. X. Chen, T. Kawanishi, K. Higuma, S. Shinada, J. Hodiak, M. Izutsu, W.S.C. Chang, and P. K. L. Yu, "Tunable Lithium Niobate Waveguide Loop", *IEEE Photon. Technol. Lett.*, vol. 16, pp. 2090-2092, Sep. 2004.

(Continued)

*Primary Examiner*—Jennifer Doan
(74) *Attorney, Agent, or Firm*—Greer, Burns & Crain, Ltd.

(57) ABSTRACT

The invention provides tunable delay or resonator devices in an electro optical substrate. Signals in at least one waveguide in the electro optical substrate pass through Y-junction reflectors which direct signals from one branch of the waveguide back into another branch of the waveguide. A coupled delay or resonator approximated loop is presented in an embodiment of the invention with opposing Y-junction reflectors. In other embodiments of the invention, a delay ladder is provided with selectable levels of delay from multiple outputs.

19 Claims, 8 Drawing Sheets

OTHER PUBLICATIONS

D.A. Cohen, M. Hossein-Zadeh, and A.F. J. Levi, "Microphotonic modulator for microwave receiver", *Electron. Lett,.* vol. 37, No. 5, pp. 300-301, Mar. 2001.

E. Lugagne Delpon, J.L. Oudar, and H. Lootvoet, "Operation of 4×1 optical register as a fast access optical buffer memory", *Electron. Lett.*, vol. 33, No. 13, pp. 1161-1162, Jun. 1997.

R.D. Esman, M.Y. Frankel, J.L. Dexter, L. Goldberg, M.G. Parent, D. Stilwell, and D.G. Cooper, "Fiber-optic prism true time-delay antenna feed", *IEEE Photon. Technol. Lett.*, vol. 5, No. 11, pp. 1347-1349, 1993.

H.S. Hinton, "Photonic Switching Using Directional Couplers", *IEEE Communications Magazine*, vol. 25, No. 5, pp. 16-26, May 1987.

Toshimi Kominato et al, "Ring Resonators Composed of $GeO_2$ doped Silica Waveguides", *Journal of Lightwave Tech.*, vol. 10, No. 12, Dec. 1992, pp. 1781-1787.

C.K. Madsen, "General IIR Optical Filter Design for WDM Applications Using All-Pass Filters", *Journal of Lightwave Technol.*, vol. 18, No. 6, pp. 860-868, Jun. 2000.

B. Moslehi, and J.W. Goodman, "Novel amplified fiber-optic recirculating delay line processor", *Journal of Lightwave Technol.*, vol. 10, No. 8, pp. 1142-1147, Aug. 1992.

T. Nakazawa, S. Taniguchi, and M. Seino, "Ti: $LiNbO_3$ Acousto-Optic Tunable Filter (AOTF)", *Fujitsu Sci. Tech. J.*, vol. 35, No. 1., pp. 107-112, Jul. 1999.

A.J. Seeds, "Microwave photonics," *IEEE Transactions on Microwave Theory Techniques*, vol. 50, No. 3, pp. 877-887, Mar. 2002.

W. Sohler, "Waveguide lasers and nonlinear devices in Lithium Niobate", *CLEO, Pacific Rim '99*, pp. 1265-1266, 1999.

R. Takahashi, T. Nakahara, H. Takenouchi, and H. Suzuki, "40-Gbit/s Label Recognition and 1×4 Self-Routing Using Self-Serial-to-Parallel Conversion", *IEEE Photonics Technology Letters*, vol. 16, No. 2, pp. 692-694, Feb. 2004.

A. Yariv, "Universal relations for coupling of optical power between microresonators and dielectric waveguides", *Electronics Letters*, vol. 36, No. 4, pp. 321-322, Feb. 2000.

H. Li, K. Ogusu, "Analysis of optical instability in a double-coupler nonlinear fiber ring resonator", *Optics Communications*, vol. 157, pp. 27-32, Dec. 1, 1998.

Dan Sadot, "Ultra-Fast tunable fiber-loop optical filters for Dense WDM applications," SPIE-Int. Soc. Opt.Eng. Proceedings of SPIE, vol. 3110, 1997, pp. 346-351.

W. Sohler, "Waveguide laser and nonlinear devices in Lithium Niobate", *CLEO, Pacific Rim '99*, pp. 1265-1266, 1999.

H. Suzuki, R. Takahashi, T. Nakahara, H. Takenouchi, K. Takahata, T. Yasui, N. Kondo, and J. Yumoto, "Ultrafast photonic interfaces for storage networking using serial-to-parallel and parallel-to-serial conversion", *Proc. of SPIE*, vol. 5069, pp. 35-44, 2003.

\* cited by examiner

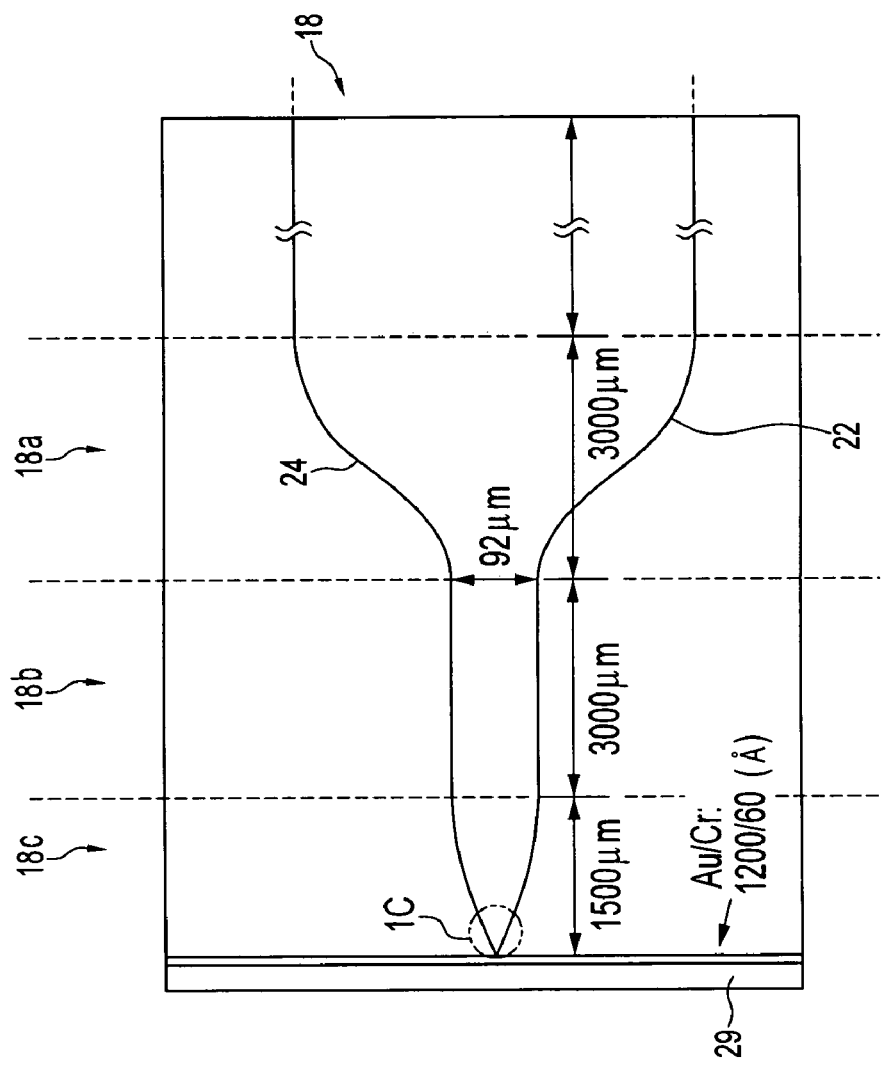
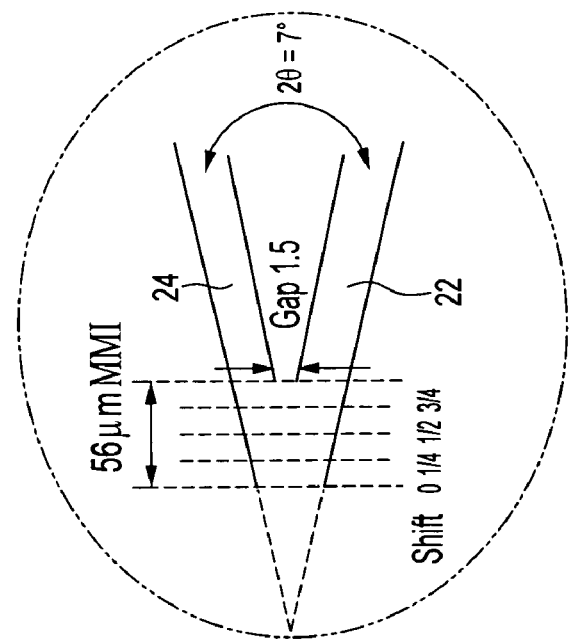
FIG. 1B
FIG. 1C

Y-JUNCTION REFLECTOR TUNABLE DELAY OR RESONATOR WAVEGUIDE DEVICES

PRIORITY CLAIM AND REFERENCE TO RELATED APPLICATION

This application claims priority under 35 U.S.C. §119 to prior provisional application 60/577,676, which was filed on Jun. 7, 2004.

STATEMENT OF GOVERNMENT INTEREST

The invention was made with government assistance from the office of Naval Research (ONR) from the University of California at San Diego ONR Fund No. 28015A. The Government has certain rights in this invention.

FIELD OF THE INVENTION

The field of the invention is optoelectronics. The invention concerns waveguide devices. The invention is applicable, e.g., to optical signal processing applications, microwave circuits, packet switching networks, wave division multiplexing, optical filters, etc.

BACKGROUND

Optoelectronic circuits have a wide range of applications, from signal processing to computing. Example applications include coherent and incoherent signal processing, optical filtering, RF filtering, switching, and modulation. The potential bandwidth, speed and other attributes of optical circuits will continue to increase their applications.

An exemplary application is to microwave circuits, e.g., the circuits used in wireless handsets to send and receive wireless network communications. The basic problem is one of simple filtering, there is a need to tune the circuit to filter a specific range around a center frequency, or frequencies, corresponding to one or more bands of operation. Tolerances in typical manufacturing processes for microwave tuning circuits lead to difficulties. The exact size, coupling efficiency, chemical composition, etc. of waveguides in microwave circuits can lead to differences in the center frequency of circuits manufactured in accordance with a particular design. Re-tuning of a manufactured optical component may require physical changes and also may not be possible within the permissible design range for a given center frequency. After the manufacture of a typical optical tuning circuit, it is difficult to modify the response frequency of the circuit.

Optical delay lines have been used to address such problems, and similar problems in other applications. One type of optical delay line provides a number of different path lengths to achieve different amounts of delay. Typically, micromechanical switches are used to switch out different path lengths and achieve a given delay. Heating is another method to change the frequency of a given waveguide. Heating of a waveguide can change the path length of the waveguide. However, heating has a slow response time, and also may not be practical as a solution in all applications.

Low loss waveguide loop or ring structures are have been used in coherent and incoherent optical signal processing, e.g., optical or RF filtering, switching, and modulation. Passive or active loops have been fabricated in a number of waveguide materials, e.g., glass waveguides, polymethyl methacrylate (PMMA), $GeO_2$-doped silica, and conventional optical fibers. The resonance frequency in these ring structures generally cannot be tuned conveniently. Some can be tuned thermally, however, the tuning speed and accuracy are not sufficient for high speed applications.

Another interesting structure in optoelectronics is the 1 to N splitter. Such splitters are used in many signal processing applications. An example application is for label recognition of photonic packet switching networks. Takahashi, et al., "40-Gbit/s Label Recognition and 1×4 Self-Routing Using Self-Serial-to-Parallel Conversion", IEEE Photon. Technol. Lett., Vol. 16, pp 692-94 (February 2004). Another application for such a splitter is to conduct data rate conversion for large-capacity storage networks. Suzuki et al., "Ultrafast Photonic Interfaces for Storage Networking Using Serial-to-Parallel and Parallel-to-Serial Conversion", Proc. of SPIE, Vol. 5069, pp 35-44 (2003). An additional splitter application is an all-optical register. Lugagne, et al., "Operation of 4×1 Optical Register as a Fast Access Optical Buffer Memory," Electron. Lett., Vol. 33, pp 1161-62 (June 1997). Splitters may also be used in optical RF beam forming. Esman et al., "Fiber-Optic Prism True Time-Delay Antenna Feed", *IEEE Photon. Technol. Lett.*, Vol. 5, pp 1347-1349, 1993. Splitters have been created using surface-emitting planar light wave circuits, as in Takashi and Suzuki (supra), using an acousto-optic modulator, as in Lugagne (supra), or using a fiber-based technique, as in Esman (supra). None of these splitting techniques admits readily of re-programming or fine-tuning to meet the dynamic variation of networks, however.

SUMMARY OF THE INVENTION

The invention provides tunable delay or resonator devices in an electro optical substrate. Signals in at least one waveguide in the electro optical substrate pass through Y-junction reflectors which direct signals from one branch of the waveguide back into another branch of the waveguide. A coupled waveguide approximated loop is presented in an embodiment of the invention with opposing Y-junction reflectors. In other embodiments of the invention, a waveguide ladder is provided with selectable levels of delay from multiple outputs.

BRIEF DESCRIPTION OF THE DRAWINGS

FIG. 1B is a schematic view of a preferred Y-junction reflector;

FIG. 1C is a detailed view of a portion of the Y-junction reflector of FIG. 1B;

DETAILED DESCRIPTION OF PREFERRED EMBODIMENTS

Embodiments of the invention provide a tunable optical delay or resonator device that uses Y-junction reflectors to approximate a loop, and applies tuning to the loop and a coupler used to pass a signal into the loop. A large tuning range can be realized in preferred embodiments. Other embodiments of the invention provide a signal-processing device including a group of tunable couplers and Y-junction reflectors formed in a ladder like structure. Selectable amounts of delay or resonance are available from different outputs of the signal-processing device. The couplers transmit part of the light guided in a meandering waveguide of Y-junction reflectors, which acts as the built-in delay or resonance line. By applying voltage to electrodes of the coupler and along the meandering waveguide, the output amplitude and phase can be tuned for each output channel. Thus, the programmable property of the signal processing device can be achieved through an electric controlling circuit. Furthermore, the output channels are coherent with each other when a narrow band continuous wave (CW) laser is used as the source.

Preferred embodiment devices are formed from lithium niobate, and the embodiments will be discussed with respect to this particular electro-optical material. Other materials may also be used though. Generally, any semi-conductor materials that exhibit an electro-optical effect can be used. Examples include multiple quantum well and heterojunction materials.

A preferred embodiment tunable optical delay or resonator device of the invention approximates a planar loop with opposing Y-junction reflectors. The approximated planar loop is tuned by an electrode. The approximated planar loop is fed by a coupler, which is also tuned by an electrode. The approximated planar loop and a waveguide coupled to the approximated planar loop. A single electro-optical crystal can be used, and the waveguides can be formed by changing the effective refractive index of the crystal in the approximated loop and the coupled waveguide. In additional embodiments, additional loops add additional delay or resonance. Each additional loop can be coupled to a proximate loop, for example.

Preferred embodiments will now be discussed with reference to the drawings, which include schematic representations that will be fully understood by ordinary artisans with reference to the following description. Features of the drawings may also be exaggerated for purposes of illustration. Experimental devices will be discussed, while artisans will appreciate broader features of the invention from understanding the particular exemplary experimental devices.

Figure 1A:
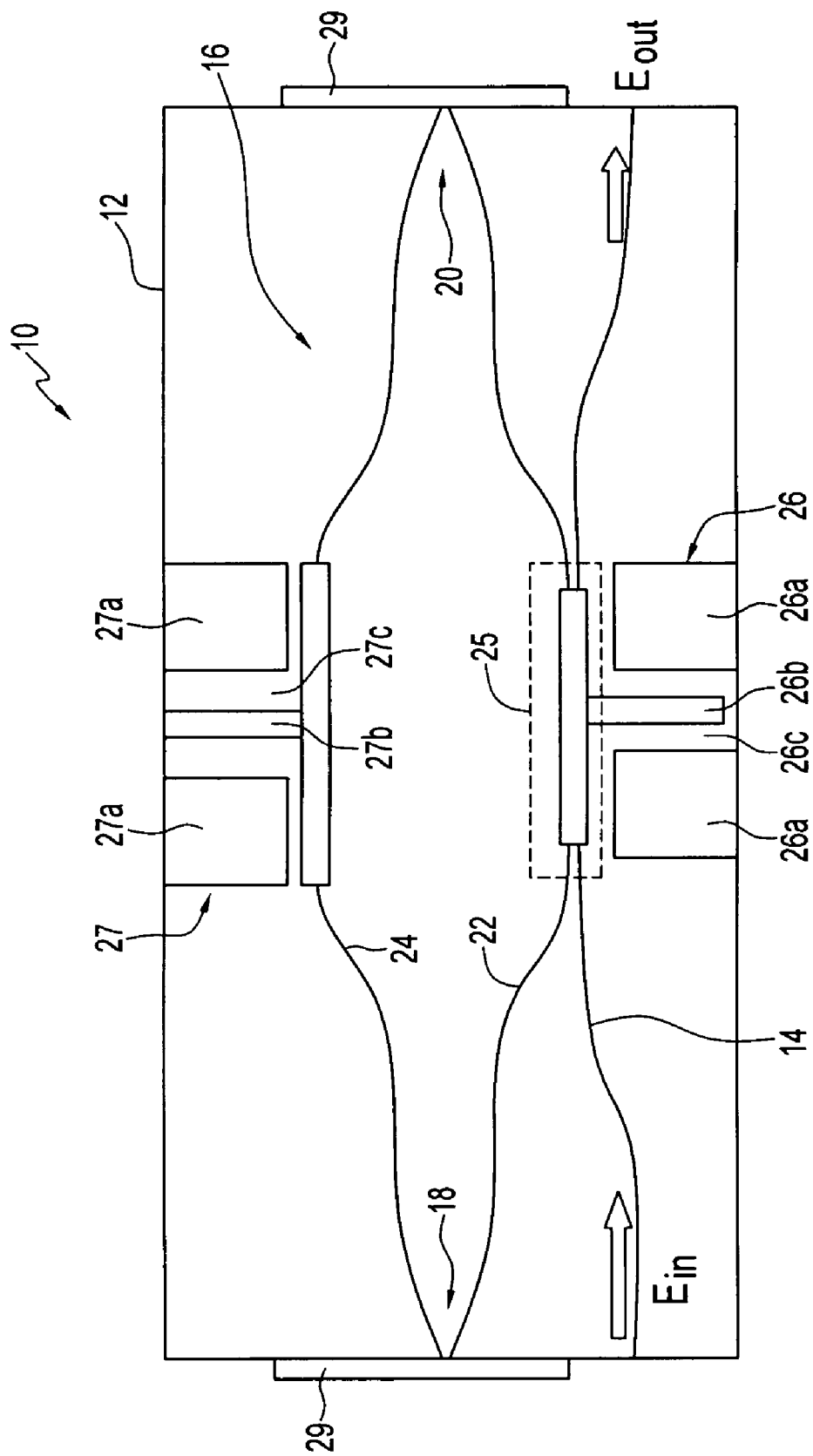
FIG. 1A is a schematic top view of a Y-junction reflector tunable optical delay or resonator device in accordance with an embodiment of the invention.

A preferred tunable optical delay or resonator device 10 is illustrated in FIG. 1A. A substrate 12 of an electro-optical material, e.g., lithium niobate, includes a through waveguide 14 that is optically coupled to an approximated loop waveguide 16. The approximated loop waveguide 16 includes opposite Y-junction reflectors 18, 20 and waveguide branches 22, 24. An optical signal is fed into the approximated loop waveguide 16 from the through waveguide 14 in a coupling area 25 between the through waveguide 14 and the branch 22 that couples to the through waveguide 14. Coupling is affected by an electric field applied by an electrode 26. Delay or resonance in the approximated loop 16 is affected by an electric field applied by an electrode 27. The electrodes 26 and 27 are configured as ground-signal-ground high speed electrodes. The electrode 26 includes ground planes 26a and signal feeding path 26b. Similarly, electrode 27 includes ground plane 27a and a signal feeding path 27b. Gaps 26c, 27c are used to separate the microwave signal feeding paths 26b, 27b, from their respective ground planes 26a, 27a. As artisans will appreciate, dimensions of the electrodes 26 and 27 are configured in accordance with the microwave signals of interest.

The Y-junction reflectors 18 and 20 can be realized with reflective end facets of the substrate 12 and terminal ends of the separate waveguide branches. Each Y-junction preferably consists of two waveguide branches merged together into one relatively wider multimode interference (MMI) branch near the end facet. Mirrors 29 are formed, for example, by metal coatings or dielectric mirrors on the end facets of the substrate 12 to form the reflective surface that feeds back an optical signal from one of the branches 22, 24 to the other. In testing, for example, it was determined that a gold-coated total reflection mirror can guide light from one waveguide branch into the other. Any losses associated with the Y-junction appear to be substantially completely related to the efficiency of the reflection surface. As an example, a prototype device was determined to have a ~1.0 dB loss, which is substantially attributable to the Y-junction reflectors. The roughness of facet and coating quality are the main contributions to the reflection loss, and optimizing these parameters can reduce losses.

FIGS. 1B and 1C illustrate a preferred embodiment Y-reflector, which may, for example, be the Y-reflector 18 in FIG. 1A. The reflector 18 includes three sections 18a, 18b, and 18c having different dimensions and gaps. The dimensions and gaps form a preferred embodiment that was also used for prototype testing. As seen in FIG. 1C, a 56 μm MMI interface is formed near the mirror 29, which is a multi-layer of Au (1200 angstroms) and Cr (60 angstroms) in a preferred embodiment. The gap narrows in section 18c to a 1.5 μm gap at the MMI, which is formed by the meeting of the waveguide braches 22 and 24 at an angle of 7 degrees, as seen in FIG. 1C.

The waveguides may be formed by a number of techniques that change the effective refractive index in the required pattern to form the approximated loop waveguide 16 and the through waveguide 14. A preferred embodiment waveguide, however, forms a separate aspect of the invention. In a preferred embodiment, the branch waveguides 22, 24 for the approximated planar loop 16 and the through line waveguide 14 that feeds the approximated planar loop 16 are formed in a lithium niobate crystal with a titanium (Ti)-diffused pattern. The titanium diffusion pattern can be formed, for example, by standard lithography and diffusion techniques.

The approximated planar loop 16 is a monolithic waveguide resonator that produces a stable coupling to the through waveguide 14. Compared with a conventional circular loop, the approximated planar loop 16 using the Y-junction reflectors 18, 20 is more compact and much of the bending loss associated with the conventional circular loops can be avoided. The resonance frequency of the loop 16 can be readily tuned via an electric field applied by the electrode 27. The tuning speed and accuracy can be much improved over those conventional delay loops in which tuning is obtained solely via thermal tuning. The invention does not exclude, however, obtaining additional tuning by using thermal tuning in addition to the electric field tuning through the electrode 27. While a single approximated loop 16 is shown, additional approximated loops may be coupled to the approximated loop 16. While the device 10 of FIG. 1A is illustrated a stand alone device, it may also form part of a larger scale integrated optical circuit, for example, and may be coupled to other optical circuits and devices, as will be appreciated by artisans.

Y-junction tunable approximated loop delay or resonator devices of the invention have a wide range of applications, including both optical and RF applications. For example, as an optical coherent resonator, it can be used as an optical comb filter or tunable channel add-drop filter for dense wavelength division multiplexed (DWDM) communication system. Due to its unique phase characteristics, the approximated loop, as a tunable all-pass filter, can be used in chromatic dispersion compensation of high speed DWDM systems. Additionally, it can function as an incoherent optical delay line in an Infinite Impulse Response optical RF filter. Furthermore, if the passive waveguide is replaced by a waveguide with optical gain, such as an Er-doped Ti-diffused waveguide with optical pumping, the approximated loop Y-junction reflector device can operate as a ring laser. More complex resonator structures could be built based on the approximated loop Y-junction reflector device.

A prototype device will now be discussed. While aspects of the prototype form features of preferred embodiments, artisans will appreciate that the invention is not at all limited to the prototype device. Particularly, artisans will appreciate that aspects of the prototype device are dictated by laboratory fabrication limitations, which will not be present in commercial fabrication.

The prototype device was consistent with the device shown in FIG. 1A. The substrate was z-cut lithium niobate. Y-junction reflectors of gold were applied to the end facet of the substrate only in the area of the Y-junctions, and not at the end facet area of the through waveguide. In the prototype device, a small piece of LN was glued to the top surface of the substrate near the end facets to support the coating of waveguide facet. In experiments, input light was coupled to the through waveguide and then into the approximated loop. The coupling coefficient is determined by (a) the effective modal index of the waveguide, (b) the length of the coupling region, and (c) the gap between the straight-through waveguide and the adjacent interconnecting waveguide of the loop.

In a prototype device, the gap between the approximated loop and the through waveguide was ~4.2 μm; the length of the through waveguide (and the general length of the lithium niobate substrate was ~14 mm; the separation between the upper and the bottom arm of the loop is ~100 μm. Therefore one round trip in the loop was ~28 mm. The overall size of the prototype device was ~14 mm×1.8 mm.

With reference again to FIG. 1A, the approximated Y-junction reflector loop 16 of the invention fits the general models of loops. The complex amplitudes of the electric fields, $E_{in}$ and $E_{out}$ for the through waveguide 14 and $E_{c1}$ and $E_{c2}$ for the coupler, are related by:

$$E_{out} = \sqrt{1-\gamma_1}(\sqrt{1-\kappa}E_{in} - j\sqrt{\kappa}E_{c2}) \quad (1)$$

$$E_{c1} = \sqrt{1-\gamma_1}(-j\sqrt{\kappa}E_{in} + \sqrt{1-\kappa}E_{c2}) \quad (2)$$

$$E_{c2} = E_{c1}\sqrt{1-\gamma_2}\operatorname{Exp}(-j2\pi nL/\lambda) \quad (3)$$

Where $E_{in}$ and $E_{out}$ are, respectively, the complex amplitudes of the input and output of the through waveguide 14; $E_{c1}$ and $E_{c2}$ are, respectively, the complex amplitudes in the branches 22 (branch coupled to through waveguide 14) and 24; κ is the optical intensity coupling coefficient of the coupler area 25; $\gamma_1$ is the optical intensity loss of the coupler area; $\gamma_2$ is the optical intensity loss of the approximated loop 16 outside the coupling area 25, including the reflection loss of Y-junction reflectors 18, 20 and the propagation loss of the approximated loop waveguide 16; L is the length of the approximated loop waveguide 16; n is the refractive index of the optical mode (of the waveguide area (for example, titanium diffused lithium niobate in a preferred embodiment); λ is the wavelength of the laser light.

A fiber can be used to feed the through waveguide 14. For the transmission characteristics, we note $$\frac{E_{out}}{E_{in}} = \frac{\sqrt{1-\kappa}\sqrt{1-\gamma_1} - (1-\gamma_1)\sqrt{1-\gamma_2}\,e^{-j2\pi nL/\lambda}}{1 - \sqrt{1-\kappa}\sqrt{1-\gamma_1}\sqrt{1-\gamma_2}\,e^{-j2\pi nL/\lambda}} \quad (4)$$

and the end-to-end optical intensity transmission of the through waveguide 14 is $$T = (1-\gamma_3)\left|\frac{E_{out}}{E_{in}}\right|^2 \quad (5)$$

where $\gamma_3$ includes the optical intensity coupling loss between the fiber and the through waveguide, and the propagation loss of the through waveguide excluding the portion of the through waveguide in the coupling area 25.

Experiments with the prototype device demonstrated a total internal loss for the approximated loop waveguide, including the Y-junction reflection loss and waveguide propagation loss, on the order of 3.5 dB. The quality factor, Q, defined by $Q=\lambda/(\Delta\lambda)_{FWHM}$, was measured at ~6.5×10⁴. To increase the Q value further, an active waveguide may be used, such as Er-doped LN waveguide, to compensate for the internal loss.

From (4), the optimal value of the coupling coefficient κ is given by, $$\kappa = 1 - (1-\gamma_1)(1-\gamma_2) \quad (6)$$

Figure 2:
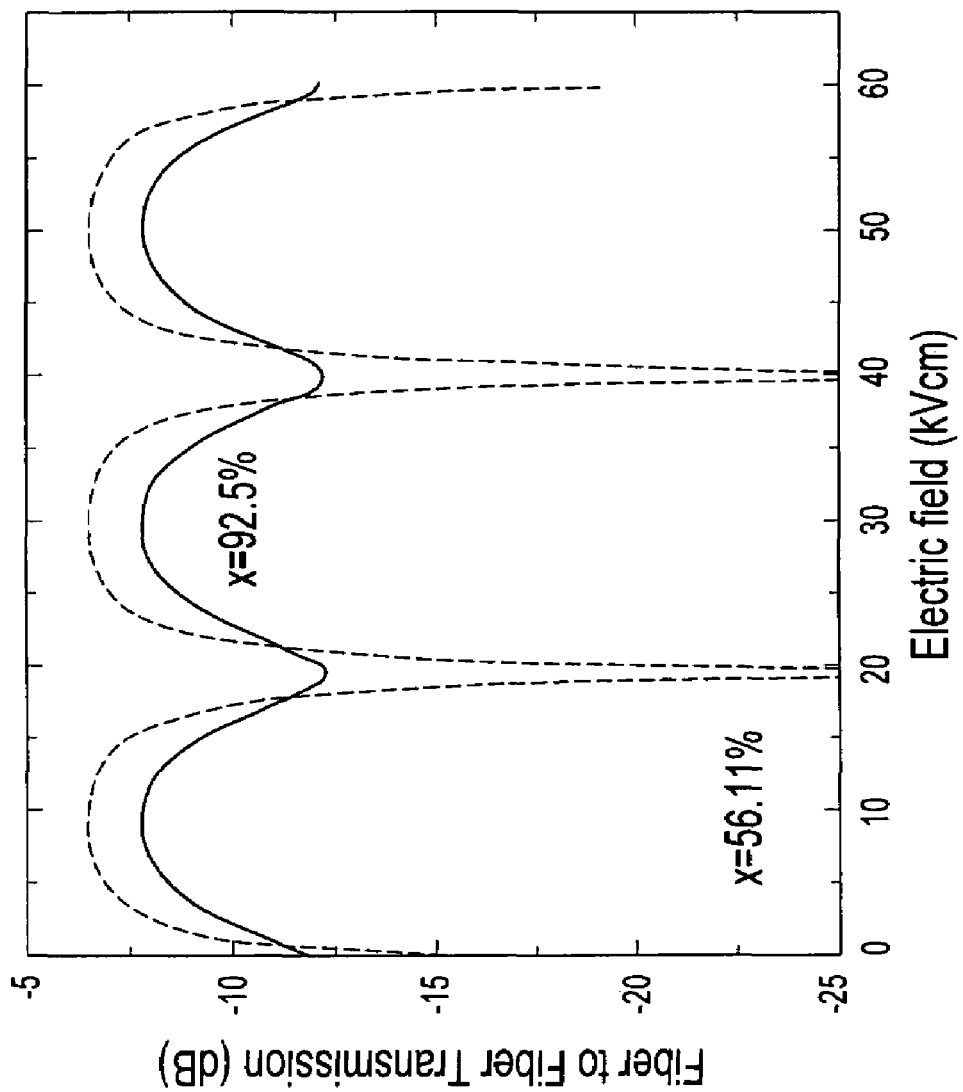
FIG. 2 is a plot illustrating tunability of a Y-junction reflector optical delay or resonator device of the invention for a coupling coefficient of about 56.1%.

Thus, for example, with $\gamma_1=-1.1$ dB, $\gamma_2=-2.4$ dB, the optimal κ is thus 56.11%. With an optimized coupling coefficient, the extinction ratio can be large, and the output light can become very small when the phase matching condition of the loop is met. The phase matching condition of the loop is met when:

$$\Delta n_e = -\frac{1}{2}n_e^3 r_{33} E_z \quad (7)$$

where $r_{33}$ is electro-optic coefficient of the substrate (e.g., lithium niobate, 30.9 pm/V); $E_z$ is the electric field. FIG. 2 plots the transmission output of the through waveguide 14 as a function of the electric field applied by the electrode 27, assuming the electrode has an effective length of 5 mm (length of branch that it exposes to the electric field of the electrode 27) and the optical wavelength is 1.5545 μm. FIG. 2 illustrates that the transmission can be periodically tuned by the applied electric field, for example, with a period ~20 kV/cm. For the case of the optimized coupling coefficient of 56.11%, the output is changed from a peak of −6.45 dB to theoretically zero with an electric field swing of 10 kV/cm. Thus, the Y-junction reflector tunable device of the invention has applications for switching or fast modulation.

In another prototype device in accordance with the general structure of FIG. 1A, two Y-junction reflectors were connected to two waveguide branches to form the approximated loop waveguide. This embodiment is shown in FIGS. 1B and 1C. The reflective coating was 120 nm thick Au with 6 nm thick Cr between the facet and Au, was applied only to the end facet of the Y-junction and not to the through waveguide. The waveguide width (for both the branches and the through waveguide) is about 6 µm. The splitting angle of Y-junction reflectors was 7° and the MMI section length is 56 µm (length of merged portion of two branches of the approximated loop waveguide). These parameters achieved low loss and high reflectivity.

Figure 3:
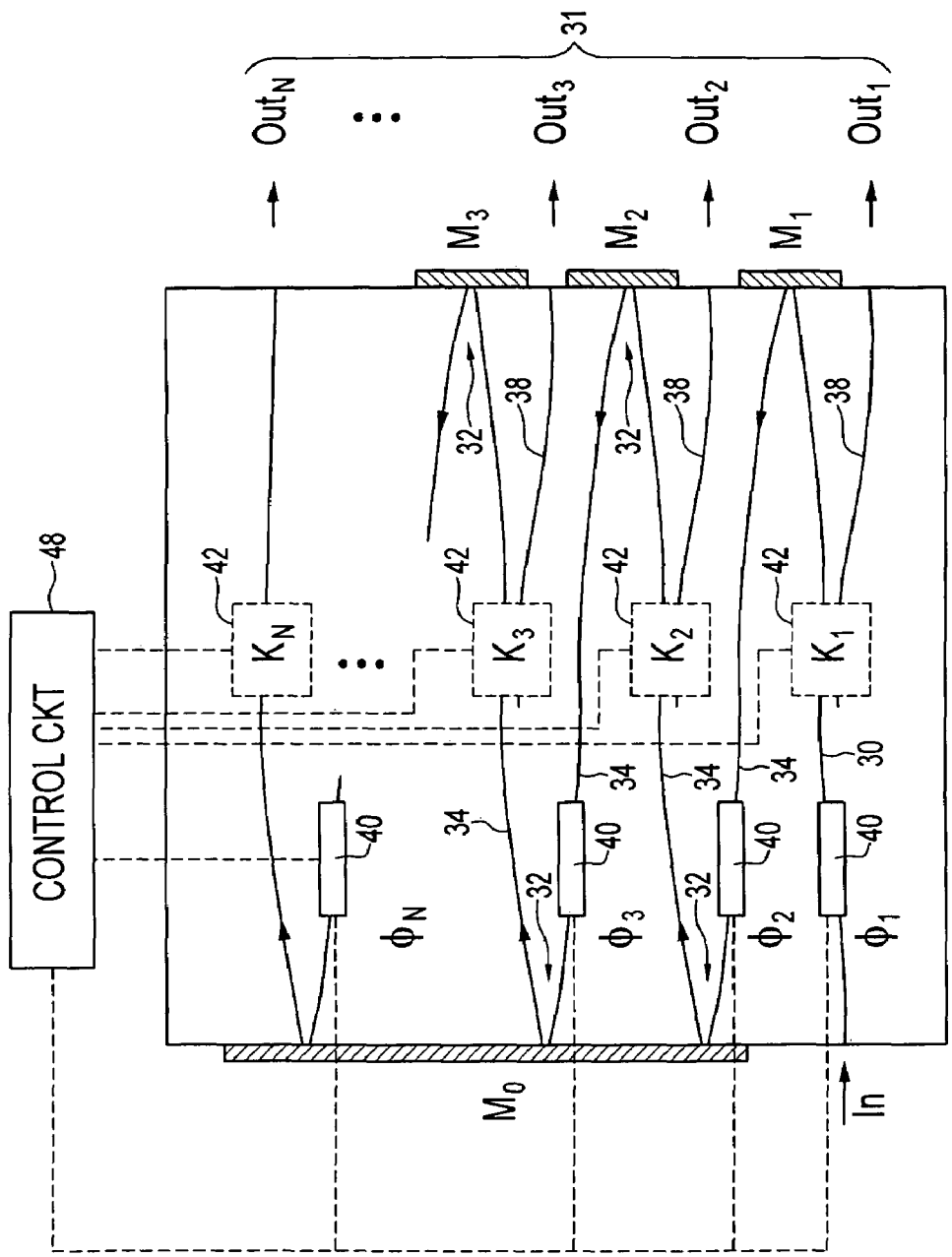
FIG. 3 is a schematic top view of a Y-junction signal processing device in accordance with an embodiment of the invention.

The principles embodied in the approximated loop with Y-junction reflectors can also be applied to create a meander delay line. FIG. 3 shows a programmable coupler ladder realized with a meander waveguide 30, having a plurality of coupled outputs 31. Y-junction reflectors 32 are formed by branches 34 of meander delay lines and mirrors $M_0$-$M_3$. The branches 34 are formed in a substrate waveguide, e.g., Z-cut LN, for example by diffused titanium. Each turning point of the meandering waveguide at the facet forms a Y-junction, preferably consisting of two waveguide branches merged together into one relatively wider multimode interference (MMI) branch near the end facet. Each mirror $M_N$ metal or dielectric high reflection mirror is coated at the output of the MMI branch Y-junction. With proper geometric design of the MMI section, each Y-junction can guide most of the incident light from one branch to the other, analogous to a mirror reflecting a light beam from one direction to another in the free space.

The mirrors $M_1$-$M_N$ are spaced apart to permit outputs from coupling waveguides 38, to permit separate outputs $O_1$-$O_N$. Electrodes 40 control phase modulation and electrodes 42 control coupling coefficient modulation. The mirror $M_0$ may be continuous or might also be formed by a plurality of spaced apart mirrors. Outputs are illustrated as being taken on the right side in FIG. 4, but might be taken from either or both sides.

A coupling waveguide 38 couples to a branch 34 of the meandering waveguide. The plurality of coupling waveguides 38 can form a series of directional couplers $K_1$, $K_2$, $K_3$... $K_N$ producing parallel outputs $O_1$-$O_N$ the bottom to the top, with each output having a different amount of delay. The facet at the termination of each coupling waveguide 38 is optically transmissive to couple light to outside. The number of outputs, N, can be optimized subject to the limitation of the propagation loss. The outputs, from $O_1$ to $O_{N-1}$, are equal to each other. The final output, the $O_N$ output, is a special case as it is the output of the meandering waveguide itself. There is no coupler for this output. $K_N$ is taken to be unity, representing an always-on state.

The electrodes 40, designated $\phi_1, \phi_2, \ldots, \phi_N$ to control phase shifting for the corresponding $O_N$. Similarly, electrodes 42 control coupling coefficients of $K_1, K_2, \ldots, K_{N-1}$, which can be tuned from 0 to 1 with proper applied voltage. By tuning both the phase and the coupling coefficient, the output of every coupler can have arbitrary amplitude and phase modulations. Response speed can be very high with appropriately selected electro-optical materials. As an example, the electro-optic response speed of LN is up to several tens of GHz. A smart control circuit, generally designated as 48 can be employed to generate suitable control signals for the electrodes 40, 42. With appropriate control, the device can function as a programmable coupler ladder.

There are many possible applications for the programmable coupler ladder of FIG. 3. The most straightforward function of the coupler ladder is to split an input signal into N channels, achieving serial-to-parallel conversion similar to a traditional 1×N power splitter. However, the programmable ladder of the present invention has a unique advantage over a traditional splitter in that every output inherently has a relative delay to the other outputs. The relative delay time is determined by the length of the waveguide between adjacent couplers along the meander waveguide 30.

Figure 4:
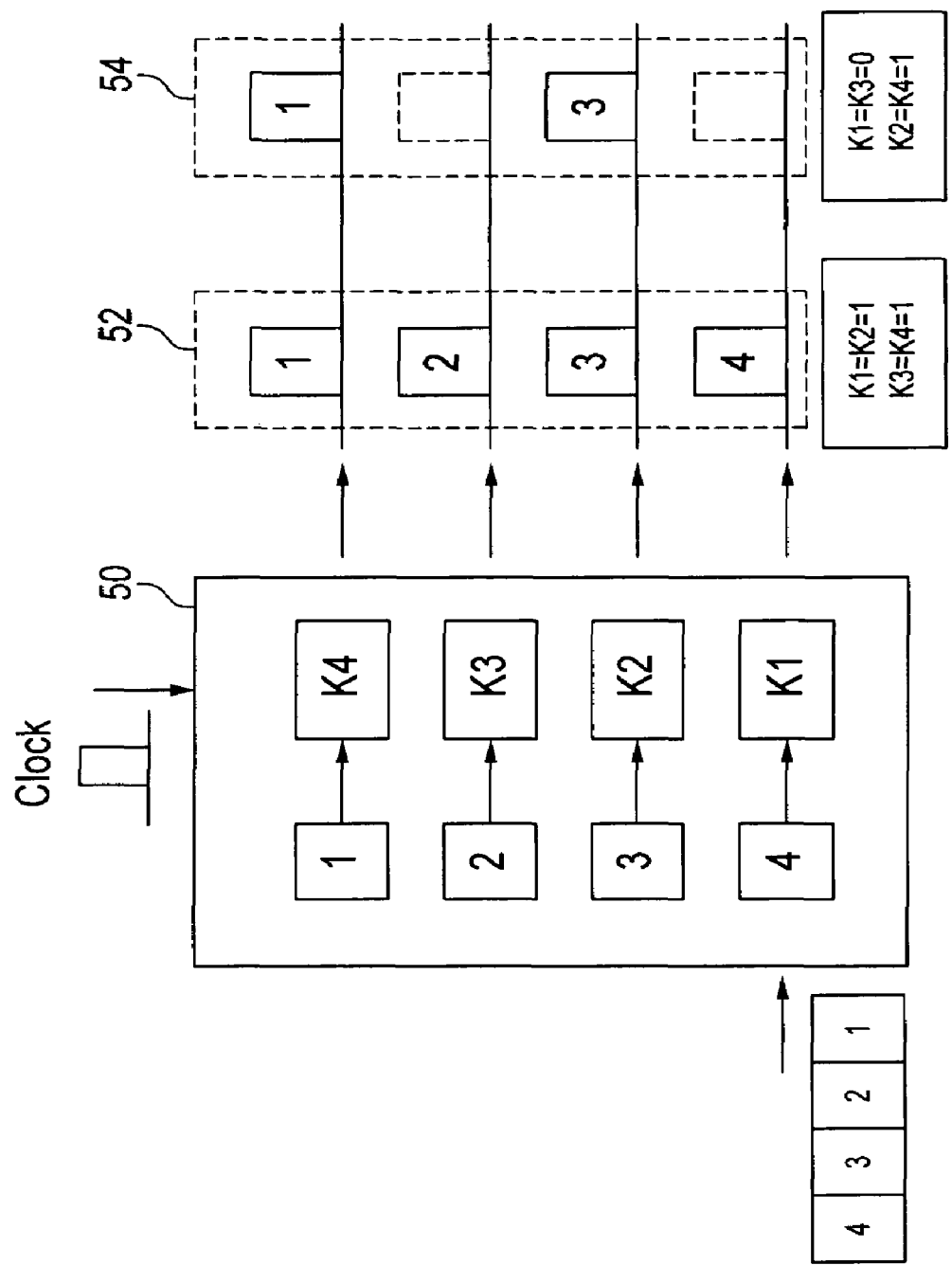
FIG. 4 illustrates a preferred embodiment pulse propagation control scheme for a Y-junction signal processing device of the invention.

FIG. 4 shows a simplified diagram for a pulse propagation and alignment of outputs. N is set to 4 for convenience. As seen in FIG. 4, bits arrive into a programmable coupler ladder 50 of the invention. The serial bits are labeled 1-4. If the coupler electrodes $K_1$-$K_4$ are set to output a bit, a parallel output of the serial input is achieved as indicated by the parallel output labeled as 52. In a previous clock cycle, the odd numbered coupling electrodes $K_1$ and $K_3$ were turned off and, as a result, in an output labeled as 54 $2^{nd}$ and $4^{th}$ output bits were output in parallel. If the built-in delay time correlates to the transmission bit rate then the output pulses will line up in the time axis. Accordingly, for the output 52 where input serial bits are simply output in parallel, no control signal has to be applied to the coupler electrodes, which simply may be maintained in an on position. This straightforward output is useful, for example, for signal processing applications such as label recognition in the packet switching networks.

Additional splitting functions, such as the output 54, can be obtained with the assistance of an electrical control signal. For example, the input pulse can be sorted using the built-in delay. Assuming the control of the coupling coefficient $K_i$ (i=1,2,3,4) can be written under a synchronized clock, a different bit pattern can be acquired by applying different control words for $K_i$. For example, for K1=K2=K3=K4=1, all the bits would be fanned out. For K1=K3=0 and K2=K4=1, only pulse 1 and pulse 3 would be swept out. This enables the device to perform signal processing at the bit level. If only one channel is allowed to be coupled out, the device becomes a programmable router.

By reversing the input and output ports, the programmable coupler ladders is also able to operate as a parallel-to-serial converter with the help of a synchronization clock. Due to the transmission characteristic of the directional coupler, an advantage of this device is that when one channel (say, the $2^{nd}$ coupler) is open for the pulse to be coupled in, the undesired pulse flow coming from the upper channels (say, the $3^{rd}$ and $4^{th}$) will be transmitted to the dummy end of the coupler of channel 2, so that the interference between the pulses will be avoided. With proper waveguide design, the light reaching the dummy end will radiate out to the substrate, without causing interference to the transmission waveguide.

Figure 5A:
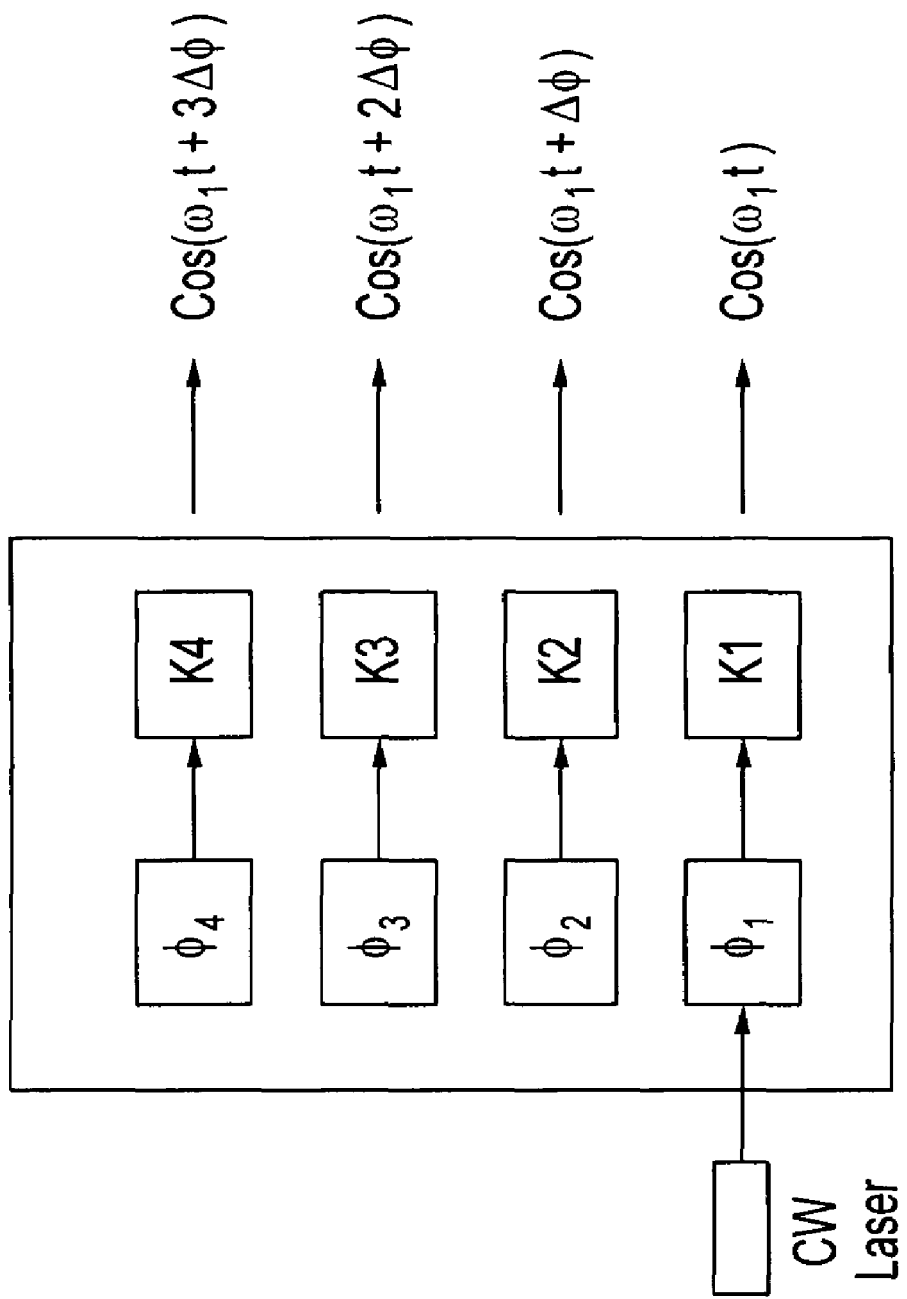
FIGS. 5A and 5B illustrates a preferred embodiment continuous wave processing scheme for a Y-junction signal processing device of the invention.

While pulsed processing has been discussed so far, the programmable coupler ladder of the invention can also perform continuous light wave processing by adjusting the amplitude and phase of each output channel $O_1$-$O_{N-1}$. FIG. 5A illustrates how the programmable coupler ladder can generate the outputs with certain relations in phase and amplitude with each other. A narrow line width continuous wave laser at $\omega_1$ is used as the light source. For simplicity, it is assumed that the output amplitudes are the same and are normalized to 1 by selecting proper values of $K_i$, so that only phases are under consideration. Since only the relative phase between channels is important, it is assumed that the phase output of first channel is 0 as a reference. By tuning the phase shifter, the device generates a phase difference of $\Delta\phi$ between every two adjacent channels.

One application for this coherent phased array is optical radio frequency (RF) beam forming. For this application a second coupler ladder at an output optical frequency of $\omega_2$ and identical phases for every analogous channel is used. A combiner array and a detector array can convert the signals from optical to RF domain. The output RF signals, which are the beat tone of $\omega_1$ and $\omega_2$, will have the same phase difference $\Delta\phi$ between every two adjacent channels. The RF generation process shown in FIG. 5B. The identical phase of $\omega_2$ is set to be 0 since only the RF phase difference is of concern. The beat tone of two laser beams in the detector is governed by the equation below:

$$[\cos(\omega_1 t + \Delta\phi) + \cos(\omega_2 t)]^2 \propto 2\cos(\omega_1 t + \Delta\phi)(\cos(\omega_2 t) \\ \propto \cos[(\omega_1 - \omega_2)t + \Delta\phi]  \quad (8)$$

The DC terms and high order frequency terms are neglected in the derivation of (8). This method can thus be utilized to adjust the RF phased array signal by fine-tuning the optical phase.

An alternative that can improve the optical phase stability during the transmission is to alternate the mirrors in FIG. 3 with some band pass filters, which reject $\omega_1$ but allow $\omega_2$ to pass through, so that $\omega_2$ can be fed through $M_0$ and mixed with $\omega_1$ in the same coupler ladder chip.

Figure 5B:
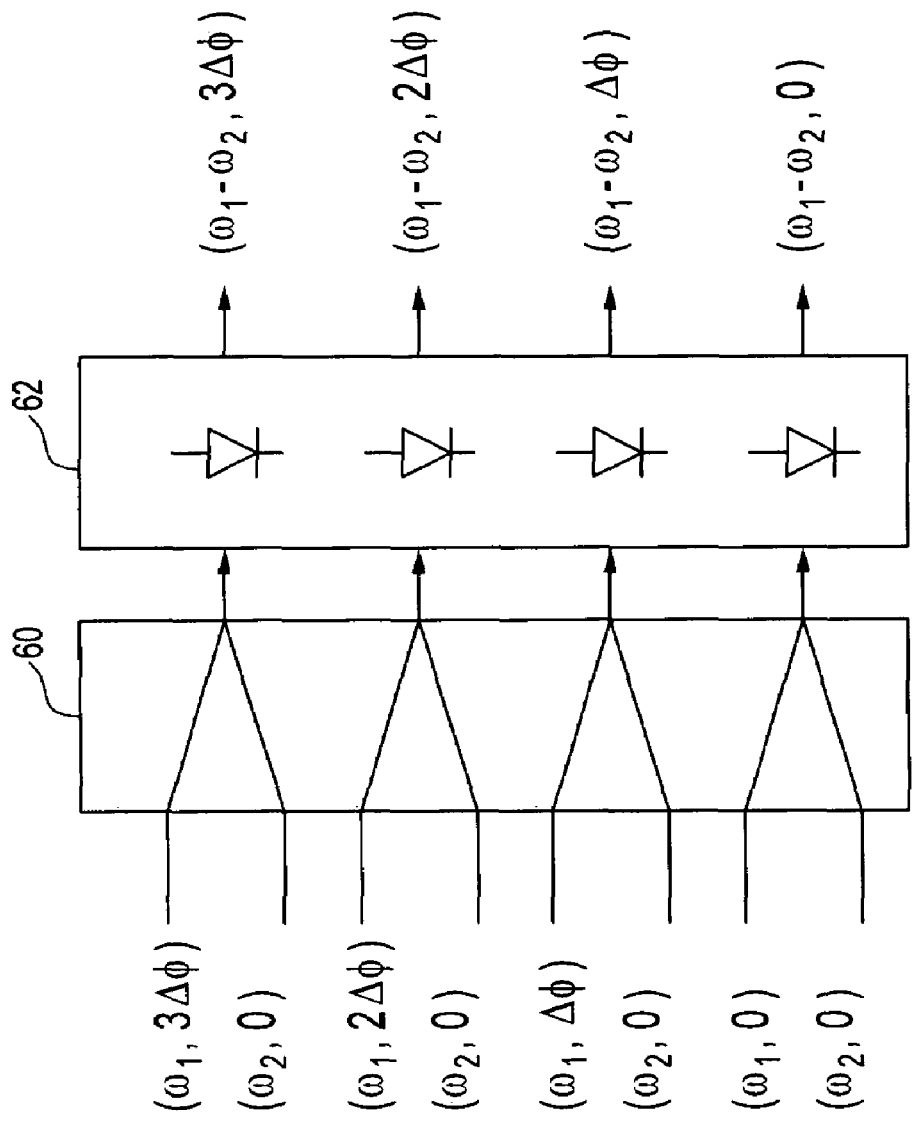

FIG. 5B illustrates the RF generation technique for a programmable delay device of the invention. Parallel optical inputs are combined and serially output by a combiner 60, which is a programmable delay device as in FIG. 3 with the signals fed into the output and out from the input. The serial signals are detected by detector channels 62, which produce an output.

Figure 6:
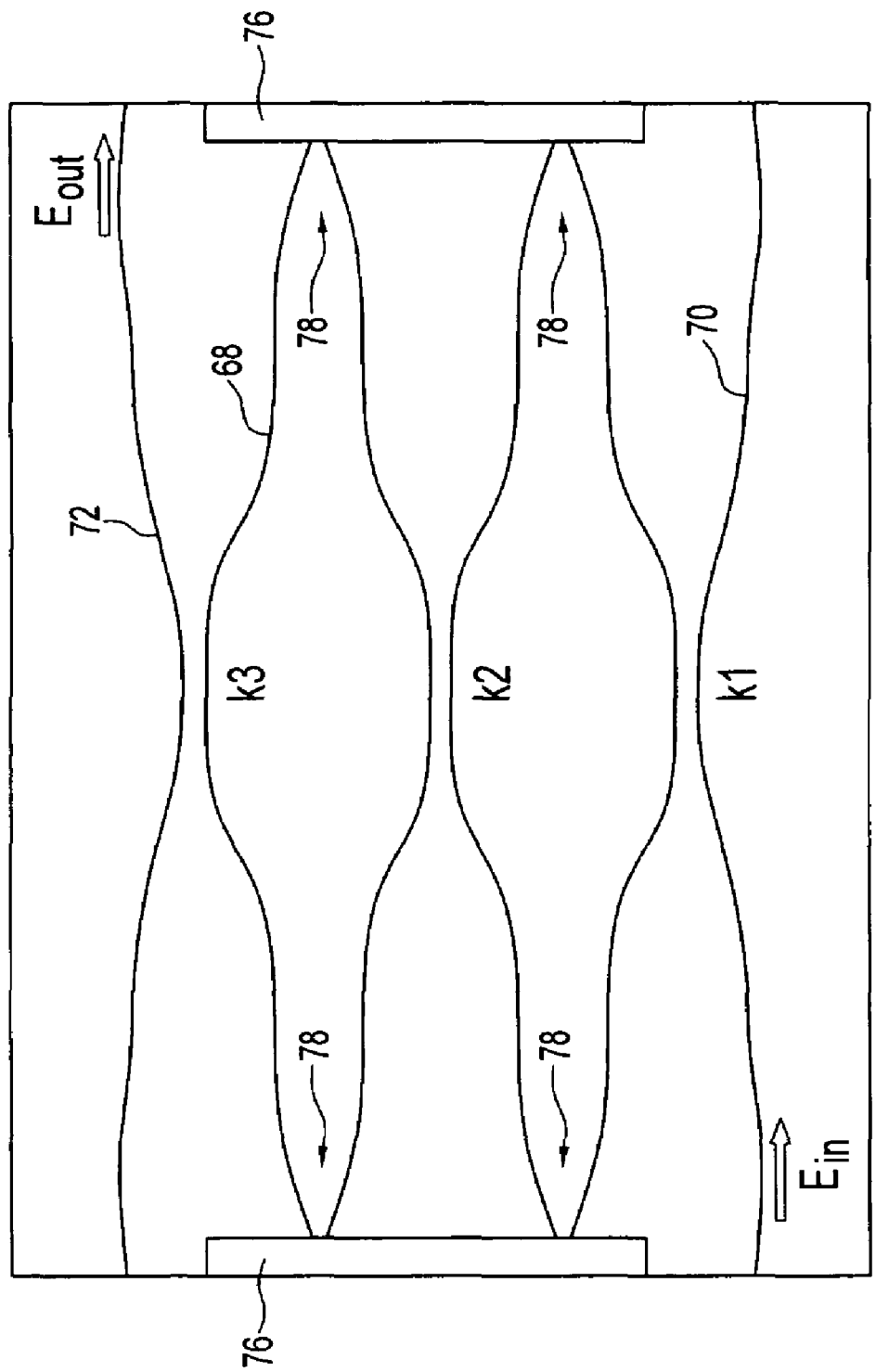
FIG. 6 is a schematic top view of another embodiment Y-junction reflector tunable optical delay or resonator device.

Another preferred embodiment tunable delay device is illustrated in FIG. 6. The embodiment of FIG. 6 is generally a multiple-loop embodiment consistent with the principles of FIGS. 1A-1C. For clarity of illustration, only the loop waveguides are illustrated in FIG. 6 (electrodes are omitted but would be formed as in the FIG. 1A embodiment). Multiple loops 68 are coupled together. Signals enter the loops 68 from a first through waveguide 70 and exit through a second through waveguide 72. Coupling between the loops and through waveguides is by coupling coefficients k1-k3 (which are controlled by the same factors as in FIG. 1A and FIG. 3). Also illustrated in FIG. 6 is an alternative reflector 76 near Y-junctions 78. Instead of the mirror 29, the reflector can be, for example, a distributed Bragg reflector or a grating inside the loop waveguides 68.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A tunable waveguide delay or resonator device, comprising:
   an electro-optical substrate;
   a first waveguide defined in said electro-optical substrate;
   a second waveguide defined in said electro-optical substrate and optically coupled to said first waveguide;
   a Y-junction reflector in at least one of said first and second waveguides;
   a first electrode to affect coupling between said first and second waveguide; and
   a second electrode to affect delay or resonance in said at least one of said first and second waveguides.

2. The device of claim 1, wherein said Y-junction reflector comprises a Y-junction meeting of waveguide branches of said at least one of said first and second waveguides and a mirror disposed on a facet of said electro-optical substrate proximate said Y-junction meeting.

3. The device of claim 1, wherein said at least one of said first waveguide and said second waveguide comprises an approximated loop with opposite Y-junction reflectors.

4. The device of claim 3, wherein the other of said at least one of said first waveguide and said second waveguide comprises a through waveguide.

5. The device of claim 4, comprising a plurality of approximated and coupled loops with Y-junction reflectors.

6. The device of claim 1, wherein said at least one of said first waveguide and said second waveguide comprises a meander waveguide with opposite Y-junction reflectors.

7. The device of claim 6, the other of said at least one of said first waveguide and said second waveguide comprises a coupled waveguide with an output and a dummy end.

8. The device of claim 7, wherein:
   said meander waveguide includes a plurality of turn, each turn being formed by a respective Y-junction reflector;
   the other of said at least one of said first and second waveguides comprises a plurality of coupled waveguides, each with an output and a dummy end and each coupled to one of a plurality of branches of said meander wave guide;
   said first electrode comprises a plurality of first electrodes each respectively affecting coupling of a one of said plurality of coupled waveguides; and
   said second electrode comprises a plurality of second electrodes each respectively affecting delay or resonance of one of said plurality of braches of said meander waveguide.

9. The device of claim 8, wherein
   said electo-optical substrate comprise lithium niobate; and
   said meander waveguide and said plurality of coupled waveguides comprise titanium diffused into said electro-optical substrate.

10. The device of claim 9, wherein each respective Y-junction reflector comprises a Y-junction meeting of waveguide branches of said meander waveguide and a mirrored facet of said electro-optical substrate.

11. The device of claim 10, comprising non-reflective spaces in at least one facet of said electro-optical substrate corresponding to outputs of said plurality of coupled waveguides.

12. The device of claim 11, further comprising a control circuit to control said plurality of first electrodes and said plurality of second electrodes.

13. The device of claim 1, wherein:
   said electo-optical substrate comprise lithium niobate; and
   said first and second waveguides comprise titanium diffused into said electro-optical substrate.

14. The device of claim 13, wherein said Y-junction reflector comprises a Y-junction meeting of waveguide branches of said at least one of said first and second waveguide and one of a mirror disposed on a facet of said electro-optical substrate proximate said Y-junction meeting, a distributed Bragg reflector, or a grating.

15. A tunable delay or resonator waveguide device, comprising:
   an electro-optical substrate;
   coupled waveguide means for accepting an input signal and introducing delay or resonance; and
   said coupled waveguide means including Y-junction reflection means for accepting optical signals from a branch of said coupled waveguide means and reflecting optical signals into another branch of said coupled waveguide means;

further comprising delay or resonance control means for affecting delay or resonance in said coupled waveguide means.

16. A tunable delay or resonator waveguide device, comprising:
   an electro-optical substrate;
   coupled waveguide means for accepting an input signal and introducing delay or resonance; and
   said coupled waveguide means including Y-junction reflection means for accepting optical signals from a branch of said coupled waveguide mean and reflecting optical signals into another branch of said coupled waveguide means;
   further comprising coupling control means for affecting coupling in said coupled waveguide means.

17. A tunable delay or resonator waveguide device, comprising:
   an electro optical substrate;
   a delay or resonance waveguide in the electro optical substrate including Y-junction reflectors which direct signals from one branch of said waveguide back into another branch of said waveguide; and
   an electrode for applying an electric field to said delay or resonance waveguide.

18. The device of claim 17, wherein said delay or resonance waveguide comprises an approximated loop, the device further comprising a through waveguide coupled to said waveguide.

19. The device of claim 17, wherein said delay or resonance waveguide comprises a meander waveguide, the device further comprising coupled waveguides coupled to branches of said meander waveguides.

* * * * *

UNITED STATES PATENT AND TRADEMARK OFFICE
CERTIFICATE OF CORRECTION

PATENT NO. : 7,657,139 B2  
APPLICATION NO. : 11/628572  
DATED : February 2, 2010  
INVENTOR(S) : Chen et al.

It is certified that error appears in the above-identified patent and that said Letters Patent is hereby corrected as shown below:

In the Specification:

Col. 1, line 60   After "structures" please delete --are--.

Col. 9, line 7   Please delete

" $[Cos(\omega_1 t+\Delta\phi)+Cos(\omega_2 t)]^2 \propto 2Cos\ (\omega_1 t+\Delta\phi\ (Cos(\omega_2 t) \propto Cos[(\omega_1-\omega_2)t+\Delta\phi]$ "

and insert

-- $[Cos(\omega_1 t+\Delta\phi)+Cos(\omega_2 t)]^2 \propto 2Cos\ (\omega_1 t+\Delta\phi)Cos(\omega_2 t) \propto Cos[(\omega_1-\omega_2)t+\Delta\phi]$ -- therefor.

In the Claims:

Col. 10, line 23  
Claim 8   Please delete "wave guide" and insert --waveguide-- therefor.

Col. 11, line 11  
Claim 16   Please delete "mean" and insert --means-- therefor.

Signed and Sealed this  
Eleventh Day of January, 2011

David J. Kappos  
*Director of the United States Patent and Trademark Office*